United States Patent
Xu et al.

(10) Patent No.: US 11,521,389 B2
(45) Date of Patent: *Dec. 6, 2022

(54) METHOD FOR GENERATING SPECIAL EFFECT PROGRAM FILE PACKAGE, METHOD FOR GENERATING SPECIAL EFFECT, ELECTRONIC DEVICE, AND STORAGE MEDIUM

(71) Applicant: BEIJING SENSETIME TECHNOLOGY DEVELOPMENT CO., LTD., Beijing (CN)

(72) Inventors: Qinqin Xu, Beijing (CN); Zhanpeng Li, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 204 days.

This patent is subject to a terminal disclaimer.

(21) Appl. No.: 16/881,143

(22) Filed: May 22, 2020

(65) Prior Publication Data

US 2020/0285858 A1 Sep. 10, 2020

Related U.S. Application Data

(63) Continuation of application No. PCT/CN2019/071094, filed on Jan. 10, 2019.

(30) Foreign Application Priority Data

Jan. 19, 2018 (CN) .......................... 201810055429.9

(51) Int. Cl.
*G06V 20/40* (2022.01)
*G06V 40/10* (2022.01)
*G06V 40/16* (2022.01)

(52) U.S. Cl.
CPC ............ *G06V 20/46* (2022.01); *G06V 40/103* (2022.01); *G06V 40/107* (2022.01); *G06V 40/165* (2022.01)

(58) Field of Classification Search
CPC .... G06V 20/46; G06V 40/103; G06V 40/107; G06V 40/165; G06V 10/82;
(Continued)

(56) References Cited

U.S. PATENT DOCUMENTS 6,469,723 B1 10/2002 Gould
9,811,894 B2 11/2017 Yu et al.
(Continued)

FOREIGN PATENT DOCUMENTS

CN 1564202 A 1/2005
CN 102567031 A 7/2012
(Continued)

OTHER PUBLICATIONS

International Search Report in the international application No. PCT/CN2019/071094, dated Apr. 12, 2019, 3 pgs.
(Continued)

*Primary Examiner* — Nimesh Patel
(74) *Attorney, Agent, or Firm* — Cooper Legal Group, LLC

(57) ABSTRACT

A method for generating a special effect program file package and a method for generating a special effect are provided. The method for generating a special effect program file package includes: importing a sub-material; obtaining a parameter value of a playback parameter of the sub-material and establishing a correspondence between a display position of the sub-material and at least one predetermined key point; and generating a special effect program file package according to the sub-material, the correspondence and the parameter value. The method for generating a special effect
(Continued)

includes: importing a special effect program file package; obtaining a parameter value of a playback parameter of a sub-material in the special effect program file package; performing key point detection on a video image; and generating a special effect of the sub-material on the video image based on the detected key point and the parameter value of the playback parameter.

22 Claims, 13 Drawing Sheets

(58) Field of Classification Search
CPC .... G06V 40/176; G06V 40/20; G06V 10/462; G06V 10/764; G06K 9/627; G06K 9/00248; G06K 9/00255; G06K 9/00268; G06K 9/00288; G06K 9/00335; G06K 9/00221; G06K 9/00302; G06K 9/00362; G06K 9/00201; G06K 9/00281; G06K 9/00315; G06K 9/00711; G06F 3/01; G06F 8/38; G06F 17/18; G06F 3/013; G06F 16/5866; G06F 16/7867; G06F 3/04842; G06F 3/04883; G06F 16/24578; G06F 16/9535; G06F 3/011; G06F 3/017; G06T 13/00; G06T 11/60; G06T 2207/10016; G06T 2200/16; G06T 5/003; G06T 2207/20201; G06T 2207/30201; G06T 7/337; G06T 15/205; G06T 3/0093; G06T 19/006; G06T 17/00; G06T 2207/30196; G06T 19/20; G06T 2207/10024; G06T 2207/20036; H04L 67/38; H04L 67/131; G06N 3/08; G06N 20/00; H04N 7/147; H04N 7/15; H04N 7/142; H04N 5/272; H04N 21/4223; H04N 21/440281; H04N 1/3935; H04N 1/40068; H04N 7/141; H04N 5/23299; H04N 19/136; H04N 21/44008; H04N 21/4728; H04N 21/4788; H04N 7/155; H04N 7/152; H04N 19/107; H04N 21/643; H04N 7/157; H04N 19/40; H04N 21/2187; H04N 21/2343; H04N 21/234363; H04M 3/567; H04M 1/72454; H04M 2250/62; H04M 3/42221; H04M 3/58

See application file for complete search history.

(56) References Cited

U.S. PATENT DOCUMENTS

| | | | | |
|---|---|---|---|---|
| 2002/0112180 | A1* | 8/2002 | Land | G06Q 10/10 |
| 2005/0135675 | A1 | 6/2005 | Chen | |
| 2006/0008247 | A1 | 1/2006 | Minami | |
| 2007/0153091 | A1* | 7/2007 | Watlington | H04N 21/4223 |
| | | | | 348/208.14 |
| 2011/0289455 | A1* | 11/2011 | Reville | G06F 3/011 |
| | | | | 715/830 |
| 2013/0230259 | A1* | 9/2013 | Intwala | G06T 5/20 |
| | | | | 382/255 |
| 2014/0043321 | A1* | 2/2014 | Matjasko | G06T 19/006 |
| | | | | 345/419 |
| 2014/0196152 | A1* | 7/2014 | Ur | G06F 21/00 |
| | | | | 726/26 |
| 2015/0220789 | A1* | 8/2015 | Wood | G06T 7/194 |
| | | | | 382/103 |
| 2015/0271438 | A1 | 9/2015 | Gandolph et al. | |
| 2016/0260204 | A1 | 9/2016 | Yu et al. | |
| 2018/0137382 | A1* | 5/2018 | Nowak | H04L 67/1097 |
| 2019/0122329 | A1 | 4/2019 | Wang et al. | |
| 2019/0236547 | A1* | 8/2019 | Huang | G06F 16/164 |
| 2020/0329272 | A1 | 10/2020 | Xu et al. | |

FOREIGN PATENT DOCUMENTS

| | | |
|---|---|---|
| CN | 102760303 A | 10/2012 |
| CN | 102801924 A | 11/2012 |
| CN | 102984465 A | 3/2013 |
| CN | 103928039 A | 7/2014 |
| CN | 104394331 A | 3/2015 |
| CN | 104469179 A | 3/2015 |
| CN | 104637078 A | 5/2015 |
| CN | 104778712 A | 7/2015 |
| CN | 104967893 A | 10/2015 |
| CN | 105451090 A | 3/2016 |
| CN | 105975935 A | 9/2016 |
| CN | 106097417 A | 11/2016 |
| CN | 106101576 A | 11/2016 |
| CN | 106231205 A | 12/2016 |
| CN | 106296781 A | 1/2017 |
| CN | 106341720 A | 1/2017 |
| CN | 106373170 A | 2/2017 |
| CN | 104469179 B | 8/2017 |
| CN | 107341435 A | 11/2017 |
| CN | 104778712 B | 5/2018 |
| CN | 106097417 B | 7/2018 |
| CN | 108259496 A | 7/2018 |
| CN | 108388434 A | 8/2018 |
| CN | 106101576 B | 7/2019 |
| JP | H1118005 A | 1/1999 |
| JP | 2000083195 A | 3/2000 |
| JP | 2001307123 A | 11/2001 |
| JP | 2003092706 A | 3/2003 |
| JP | 2004171184 A | 6/2004 |
| JP | 2005242566 A | 9/2005 |
| JP | 2006260198 A | 9/2006 |
| JP | 2007087346 A | 4/2007 |
| JP | 2007156945 A | 6/2007 |
| JP | 2007257585 A | 10/2007 |
| JP | 2008536211 A | 9/2008 |
| JP | 2012113677 A | 6/2012 |
| JP | 2017010543 A | 1/2017 |
| KR | 20040018425 A | 3/2004 |
| KR | 20100069648 A | 6/2010 |
| WO | 2017190646 A1 | 11/2017 |

OTHER PUBLICATIONS

English translation of the Written Opinion of the International Search Authority in the international application No. PCT/CN2019/071094, dated Apr. 12, 2019, 5 pgs.
First Office Action of the Chinese application No. 201810055429.9, dated Oct. 25, 2019, 32 pgs.
Second Office Action of the Chinese application No. 201810055429.9, dated Jun. 1, 2020, 10 pgs.
First Office Action of the Japanese application No. 2020-528474, dated Jun. 25, 2021, 12 pgs.
First Office Action of the Korean application No. 10-2020-7016777, dated Aug. 15, 2021, 22 pgs.
Written Opinion of the Singaporean application No. 11202004849Y, dated May 31, 2021, 8 pgs.
First Office Action of the U.S. Appl. No. 16/914,622, dated Nov. 22, 2021, 42 pgs.
International Search Report in the international application No. PCT/CN2019/074503, dated May 9, 2019, 2 pgs.
English translation of the Written Opinion of the International Search Authority in the international application No. PCT/CN2019/074503, dated May 9, 2019, 5 pgs.
First Office Action of the Chinese application No. 201810129969.7, dated Feb. 26, 2020, 35 pgs.
Second Office Action of the Chinese application No. 201810129969.7, dated Sep. 14, 2020, 69 pgs.
Supplementary European Search Report in the European application No. 19750743.7, dated Mar. 10, 2021, 10 pgs.

(56) References Cited

OTHER PUBLICATIONS

"Final Cut Pro User's Manual", Feb. 2021, Apple Computer Inc., Internet Citation, XP002595986, Retrieved from the Internet: URL: http://www.arch.virginia.edu/ejm9k/arch545/handouts/FCP1.2UM.pdf, 375 pgs.

First Written Opinion of the Singaporean application No. 11202006351V, dated Jul. 20, 2021, 8 pgs.

First Office Action of the Korean application No. 10-2020-7019275, dated Jul. 30, 2021, 6 pgs.

"Image Changer", Nov. 1997, Nakakawa Real Masami, Java, Software Design Software Design, Japan, Technical Knowledge, Inc., 7 pgs.

First Office Action of the Japanese application No. 2020-536227, dated Aug. 17, 2021, 30 pgs.

First Office Action of the Indian application No. 202027038304, dated Aug. 27, 2021, 6 pgs.

First Office Action of the European application No. 19750743.7, dated Dec. 8, 2021, 6 pgs.

\* cited by examiner

METHOD FOR GENERATING SPECIAL EFFECT PROGRAM FILE PACKAGE, METHOD FOR GENERATING SPECIAL EFFECT, ELECTRONIC DEVICE, AND STORAGE MEDIUM

CROSS REFERENCE TO RELATED APPLICATIONS

This is a continuation of International Patent Application No. PCT/CN2019/071094, filed on Jan. 10, 2019, which claims priority to Chinese Patent Application No. 201810055429.9, filed on Jan. 19, 2018. The disclosures of International Patent Application No. PCT/CN2019/071094 and Chinese Patent Application No. 201810055429.9 are hereby incorporated by reference in their entireties.

BACKGROUND

Augmented Reality (AR) is a new technique for "seamlessly" integrating real world information with virtual world information, and relates to after performing analog simulation on entity information of the reality world in certain time and space ranges, then superposing the virtual information, applying the virtual information to the real world, and superposing characters and environment in the real world as well as the virtual objects to the same picture or space in real time to exist at the same time, so as to implement sensory experience beyond reality.

SUMMARY

The present disclosure relates to computer vision technology, and in particular to a method and apparatus for generating a special effect program file package, a method and apparatus for generating a special effect generation, and an electronic device.

Embodiments of the present disclosure provide a technical solution for generating a special effect.

According to an aspect of the embodiments of the present disclosure, a method for generating a special effect program file package provided includes: importing a sub-material; obtaining a parameter value of a playback parameter of the sub-material, and establishing a correspondence between a display position of the sub-material and at least one predetermined key point; and generating a special effect program file package according to the sub-material, the correspondence, and the parameter value.

According to another aspect of the embodiments of the present disclosure, a method for generating a special effect provided further includes: importing a special effect program file package; obtaining a parameter value of a playback parameter of a sub-material in the special effect program file package; performing key point detection on a video image; and based on the detected key point and the parameter value of the playback parameter, generating a special effect of the sub-material on the video image.

According to another aspect of the embodiments of the present disclosure, an apparatus for generating a special effect program file package provided includes: a first import module, configured to import a sub-material; a first obtaining module, configured to obtain a parameter value of a playback parameter of the sub-material, and establish a correspondence between a display position of the sub-material and at least one predetermined key point; and a first generation module, configured to generate a special effect program file package according to the sub-material, the correspondence, and the parameter value.

According to another aspect of the embodiments of the present disclosure, an apparatus for generating a special effect provided includes: a second import module, configured to import a special effect program file package; a second obtaining module, configured to obtain a parameter value of a playback parameter of a sub-material in the special effect program file package; a key point detection module, configured to perform key point detection on a video image; and a second generation module, configured to, based on the detected key point and the parameter value of the playback parameter, generate a special effect of the sub-material on the video image.

According to yet another aspect of the embodiments of the present disclosure, an electronic device is provided, includes: a memory configured to store computer programs; and a processor configured to execute the computer programs stored in the memory, where upon execution of the computer programs, the processor is configured to implement the method operated according to any one of the embodiments of the present disclosure.

According to a further aspect of the embodiments of the present disclosure, a computer readable storage medium is provided, having computer programs stored thereon, where the computer programs, when being executed by a processor, cause the processor to implement the method according to any one of the embodiments of the present disclosure.

According to another aspect of the embodiments of the present disclosure, a computer program is provided, including computer instructions, where the computer instructions, when being executed by a processor of a device, cause to implement the method according to any one of the embodiments of the present disclosure.

The technical solutions of the present disclosure are further described in detail with reference to the accompanying drawings and embodiments as follows.

BRIEF DESCRIPTION OF THE DRAWINGS

The accompanying drawings constituting a part of the specification describe embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
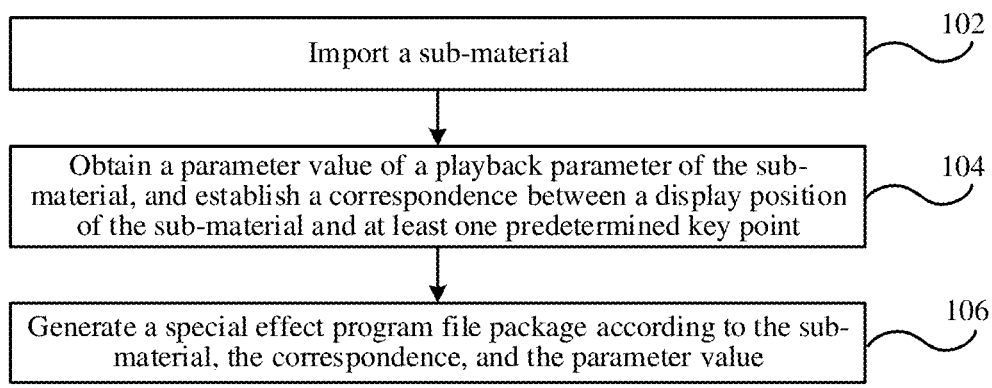
FIG. 1 is a flowchart of an embodiment of a method for generating a special effect program file package of the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

It should be further understood that in the embodiments of the present disclosure, "a plurality of" may refer to two or more, and "at least one" may refer to one, two, or more.

A person skilled in the art may understand that the terms such as "first" and "second" in the embodiments of the present disclosure are only used to distinguish different steps, devices or modules, etc., and do not represent any specific technical meaning or an inevitable logical sequence therebetween.

It should be further understood that any component, data, or structure mentioned in the embodiments of the present disclosure should be generally understood as one or more under the condition that no explicit definition is provided or no opposite motivation is provided in the context.

It should also be understood that, the descriptions of the embodiments in the present disclosure focus on differences between the embodiments, and for same or similar parts in the embodiments, refer to these embodiments. For the purpose of brevity, details are not described again.

In addition, it should be understood that, for ease of description, the scale of each part shown in the accompanying drawings is not drawn in actual proportion.

The following descriptions of at least one exemplary embodiment are merely illustrative actually, and are not intended to limit the present disclosure and applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

In addition, the term "and/or" in the present disclosure only describes an association relation between associated objects, indicating that three relations may exist, for example, A and/or B may indicate three conditions, i.e., A exists separately, A and B exist at the same time, and B exists separately. In addition, the character "/" in the present disclosure generally represents the preceding and latter associated objects are in an "or" relation.

The embodiments of the present disclosure may be applied to electronic devices such as terminal devices, computer systems, and servers, which may operate with numerous other general-purpose or special-purpose computing system environments or configurations. The embodiments of the present disclosure may be applied to electronic devices such as terminal devices, computer systems, and servers, which may operate with numerous other general-purpose or special-purpose computing system environments or configurations.

The electronic devices such as terminal devices, computer systems, and servers may be described in the general context of computer system executable instructions (such as, program modules) executed by the computer systems. Generally, the program modules may include routines, programs, target programs, components, logics, data structures, and the like for performing specific tasks or implementing specific abstract data types. The computer systems/servers may be practiced in the distributed cloud computing environments in which tasks are performed by remote processing devices that are linked through a communications network. In the distributed computing environments, the program modules may be located in local or remote computing system storage mediums including storage devices.

FIG. 1 is a flowchart of an embodiment of a method for generating a special effect program file package of the present disclosure. The method for generating a special effect program file package of the embodiments of the present disclosure, for example, may be implemented by means of, but not limited to, an apparatus (referred to as the apparatus for generating a special effect program file package of the embodiments of the present disclosure). As shown in FIG. 1, the method for generating a special effect program file package includes the following steps.

In 102, a sub-material is imported.

In an implementation of the embodiments of the present disclosure, the sub-material, for example, may include, but not limited to, any one or more of: a picture, an animation, a video, a sound, etc.

In an optional example, the operation 102 may be performed by a processor by invoking a corresponding instruction stored in a memory, and may also be performed by a first import module run by the processor.

In 104, a parameter value of a playback parameter of the sub-material is obtained, and a correspondence between a display position of the sub-material and at least one predetermined key point is established.

In an optional example, the operation 104 may be performed by a processor by invoking a corresponding instruction stored in a memory, and may also be performed by a first obtaining module run by the processor.

In 106, a special effect program file package is generated according to the sub-material, the correspondence, and the parameter value.

In the embodiments of the present disclosure, the special effect program file package may be used for processing a special effect of a video, to generate the special effect of the sub-material on the video, for example, performing rendering processing of an AR effect on the video.

In an optional instance, the operation 106 may be performed by a processor by invoking a corresponding instruction stored in a memory, and may also be performed by a first generation module run by the processor.

For the method for generating a special effect program file package provided according to the aforementioned embodiments of the present disclosure, when generating the special effect program file package, a sub-material is imported; a parameter value of a playback parameter of the sub-material is obtained, and a correspondence between a display position of the sub-material and at least one predetermined key point is established; and a special effect program file package is generated according to the sub-material, the correspondence, and the parameter value, so that the special effect processing is made based on the special effect program file package. The embodiments of the present disclosure can generate a special effect program file that can be executed by a rendering engine without manually writing the program file; the operation is simple, the required time is short, the entire efficiency for implementing the special effect is improved, errors that may occur during manually writing the program file are avoided, and accuracy of the special effect function is effectively guaranteed.

Figure 2:
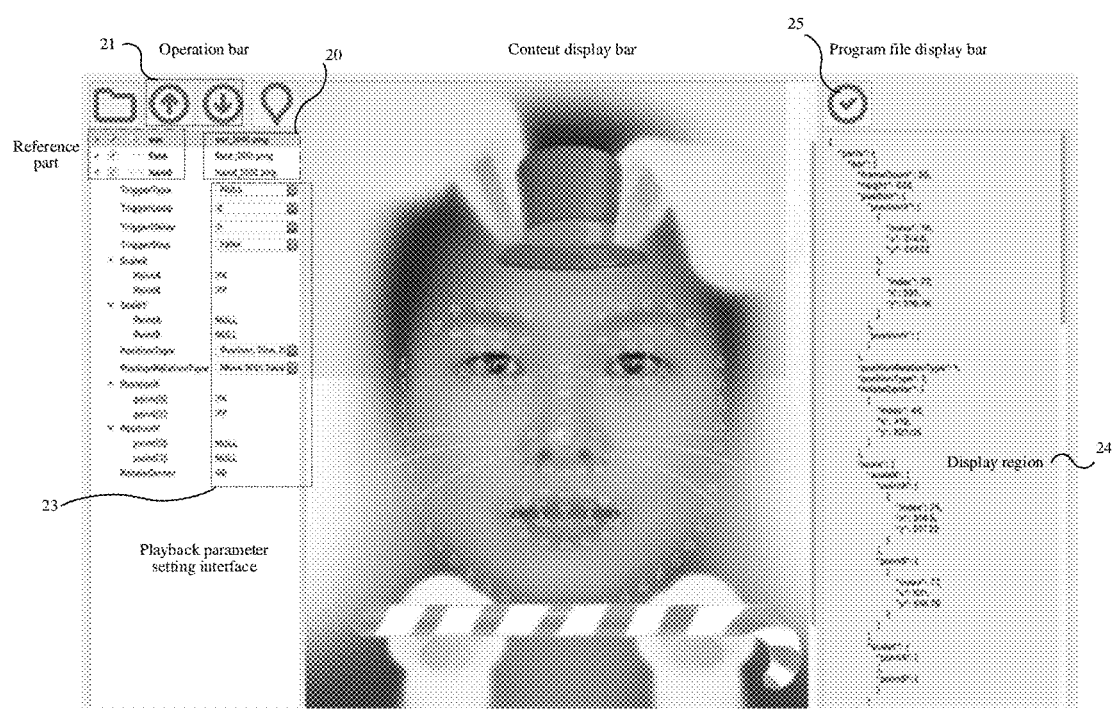
FIG. 2 is a sample graph of an operation interface of an apparatus for generating a special effect program file package in embodiments of the present disclosure.

In an implementation of the embodiments of the present disclosure, the apparatus for generating a special effect program file package may include a preset special effect program file, for example, it may be a JavaScript Object Notation (json) file or other any executable program files. The parameter value of the playback parameter of the special effect program file may be vacant or may be preset as a default; when receiving the parameter value set for the playback parameter of the sub-material, the corresponding parameter value in the special effect program file may be automatically updated as the received parameter value. Optionally, the apparatus for generating the aforementioned special effect program file package may include an operation bar; the operation bar is provided with at least one interaction interface, for receiving the parameter value set for the playback parameter of the sub-material; in addition, the apparatus for generating the aforementioned special effect program file package may further include a program file display bar, for displaying the program file of the playback parameter of the sub-material, as shown in FIG. 2, it is an operation interface sample diagram of the apparatus of generating the special effect program file package, and the operation interface of the apparatus of generating the special effect program file package includes the operation bar and the program file display bar. After the apparatus of generating the special effect program file package is started, corresponding to the playback parameter setting interface of a sub-material in the operation bar, the program file display bar displays the special effect program file when the playback parameter of the sub-material is vacant or is set as the default; when the parameter value set for the playback parameter of the sub-material is received by means of the interaction interface of the operation bar, the parameter value set for the playback parameter of the sub-material is updated as the latest received parameter value; the program file display bar displays in real time the special effect program file after updating the parameter value. It should be explained that the program file displayed in the program file display bar in FIG. 2 is only used for exemplified explanation of the operation interface shown for the apparatus for generating the special effect program file package; the embodiments of the present disclosure do not need to pay attention to and do not need to define the expression mode and specific content of the program file therein, either; the expression mode and specific content of the program file can be set or updated according to requirements.

In an implementation of the special effect program file package generation method embodiments of the present disclosure, operation 102 may include: receiving an import instruction sent through an interaction interface of an operation bar, and importing the sub-material of a material file folder to which the import instruction is directed.

Figure 3:
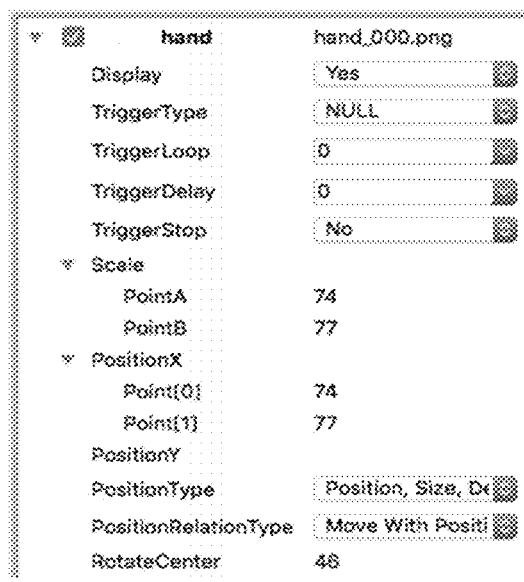
FIG. 3 is an exemplified schematic diagram of a playback parameter setting interface of a sub-material when a reference part is a hand in the embodiments of the present disclosure.

As shown in FIG. 2, it serves as an optional example of the embodiments of the present disclosure rather than limitation; the operation bar may include a special effect parameter setting interface, which includes at least one interaction interface; in addition, it may further include other regions, for example, a reference part display region; at this moment, the special effect parameter setting interface may be the special effect parameter setting interface of each reference part. The reference part in the embodiments of the present disclosure, for example, may include, but not limited to, any one or more of: an ear, a hand, a face, hair, a neck, or a limb. FIG. 3 is an exemplified schematic diagram of a playback parameter setting interface of a sub-material when a reference part is a hand in the embodiments of the present disclosure. In an optional example of the aforementioned implementations of the present disclosure, the receiving the import instruction sent through the interaction interface of the operation bar and importing the sub-material in the material file folder to which the import instruction is directed may include: receiving the import instruction sent through the interaction interface in the special effect parameter setting interface of the operation bar and importing the sub-material of the material file folder to which the import instruction is directed.

Or, in another optional example of the aforementioned implementations of the present disclosure, the receiving the import instruction sent through the interaction interface of the operation bar and importing the sub-material in the material file folder to which the import instruction is directed may include: receiving a selection instruction sent through the interaction interface of the operation bar, using a reference part selected by the selection instruction as a target part to be currently required to add a special effect, and displaying the special effect parameter setting interface of the target part at the operation bar; and receiving the import instruction sent through the interaction interface in the special effect parameter setting interface, and importing the sub-material of the material file folder to which the import instruction is directed.

In another optional example of the aforementioned implementation of the present disclosure, the receiving the import instruction sent through the interaction interface of the operation bar, and importing the sub-material in the material file folder to which the import instruction is directed may include:

receiving the import instruction sent through the interaction interface, and obtaining and displaying the material file folder directed by the import instruction;

importing the sub-material selected by a sub-material selection operation in response to reception of the sub-material selection operation on the material file folder; and/or, selecting at least one sub-material in the material file folder according to a preset setting and importing the at least one sub-material selected according to the preset setting in response to no reception of the sub-material selection operation on the material file folder.

Each material file holder may include 7 sub-materials, for example, if the target part is an ear, the file folder may include sub-materials such as ear rings or earmuffs with different shapes and colors; in an implementation of the embodiments of the present disclosure, when importing the sub-material, when the selection operation for the sub-material in the material file folder by the user is not received, importing the sub-material with a preset position or a preset serial number in the material file folder directed by the import instruction can be set in advance. For example, when the user does not select the sub-material, a first sub-material in the material file folder is defaulted to be selected and imported.

In an implementation of the embodiments of the present disclosure, in operation 104, the obtaining the parameter value of the playback parameter of the sub-material may include:

in response to the parameter value set for the playback parameter of the sub-material sent through the interaction interface in the special effect parameter setting interface being received, using the set parameter value as the parameter value of the playback parameter of the sub-material; and/or, in response to the parameter value set for the playback parameter of the sub-material sent through the interaction interface in the special effect parameter setting interface being not received, using a preset parameter value as the parameter value of the playback parameter of the sub-material.

The embodiments of the present disclosure can generate a file that can be executed by a rendering engine without manually writing the program file; the generation of the special effect program package can be implemented based on the selection operation on the sub-material and the setting operation on the parameter value in the operation bar of the user; the operation is simple, the required time is short, the entire efficiency for implementing the special effect is improved, errors that may occur during manually writing the program file are avoided, and accuracy of the special effect function is effectively guaranteed.

In an implementation of the embodiments of the present disclosure, the key point, for example, may include, but not limited to, any one or more of: a head key point, a face key point, a shoulder key point, an arm key point, a gesture key point, a waist key point, a leg key point, a foot key point, a body skeleton key point, etc.

In an optional example, the head key point, for example, may include, but not limited to, any one or more of: a head top key point, a nose tip key point, a jaw key point, etc.

In an optional example, the face key point, for example, may include, but not limited to, any one or more of: a face profile key point, an eye key point, an eyebrow key point, a nose key point, a mouth key point, etc.

Exemplarily, the eye key point, for example, may include, but not limited to, any one or more of: a left eye orbit key point, a left eye pupil center key point, a left eye center key point, a right eye orbit key point, a right eye pupil center key point, a right eye center key point, etc. The eyebrow key point, for example, may include, but not limited to, any one or more of: a left eyebrow key point and a right eyebrow key point, etc. The nose key point, for example, may include, but not limited to, any one or more of: a nose bridge key point, a nose lower edge key point, a nose outside profile key point, etc. The mouth key point, for example, may include, but not limited to, any one or more of: an upper lip key point and a lower lip key point, etc.

In an optional example, the shoulder key point, for example, may include, but not limited to, any one or more of: a shoulder and head intersection key point located at an intersection position of a shoulder and a head, a shoulder profile middle key point located at a middle position between an arm root profile key point and the shoulder and head intersection key point, etc.

In an optional example, the arm key point, for example, may include, but not limited to, any one or more of: a wrist profile key point, an elbow profile key point, an arm root profile key point, a lower arm profile middle key point located at a middle position between the wrist profile key point and the elbow profile key point, an upper arm middle key point located at a middle position between the elbow profile key point and the arm root profile key point, etc.

In an optional example, the gesture key point, for example, may include, but not limited to, any one or more of: four vertex key points of a gesture box (i.e., a gesture detection box), a central key point of the gesture box, etc.

In an optional example, the leg key point, for example, may include, but not limited to, any one or more of: a crotch key point, a knee profile key point, an ankle profile key point, a thigh root outside profile key point, a shank profile middle key point located at a middle position between the knee profile key point and the ankle profile key point, a thigh inner profile middle key point located at a middle position between the knee inner profile key point and the crotch key point, a thigh outer profile middle key point located at a middle position between the knee outer profile key point and the thigh root outside profile key point, etc.

In an optional example, the waist key point, for example, may include, but not limited to, any one or more of: N equal division points generated by dividing the thigh root outside profile key point and the arm root profile key point into N equal parts, where N is greater than 1.

In an optional example, the foot key point, for example, may include, but not limited to, any one or more of: a tiptoe key point, a heel key point, etc.

In an optional example, the body skeleton key point, for example, may include, but not limited to, any one or more of: a right shoulder skeleton key point, a right elbow skeleton key point, a right wrist skeleton key point, a left shoulder skeleton key point, a left elbow skeleton key point, a left wrist skeleton key point, a right hip skeleton key point, a right knee skeleton key point, a right ankle skeleton key point, a left hip skeleton key point, a left knee skeleton key point, a left ankle skeleton key point, a head top skeleton key point, a neck skeleton key point, etc.

In the embodiments of the present disclosure, the positions of multiple key points can be preset, so as to perform position relation correspondence between the display position of the sub-material and the key points. When setting the parameter value of the playback parameter of the sub-material, key points can be directly selected from a preset key point set as the parameter value in the corresponding playback parameter.

For example, in an implementation, based on face detection and gesture detection, multiple key points can be defined for the face and gesture (hand) so as to implement the correspondence of the position relation based on the face key point or the gesture key point during special effect generation.

Figure 4:
FIG. 4 is an exemplified schematic diagram of a face key point in the embodiments of the present disclosure.

For example, FIG. 4 is an exemplified schematic diagram of a face key point in the embodiments of the present disclosure. By combining FIG. 4, in an optional example, the face key point can be defined as follows:

| Key point item | Key point serial number | Key point item | Key point serial number |
|---|---|---|---|
| Face frame (face profile key point) | 0-32 | Nose bridge | 43-46 |

-continued

| Key point item | Key point serial number | Key point item | Key point serial number |
|---|---|---|---|
| Left eyebrow | 33-37, 64-67 | Right eyebrow | 38-42, 68-71 |
| Left eye orbit | 52-57, 72-73 | Right eye orbit | 58-63, 75-76 |
| Left eye pupil | 74, 104, | Right eye pupil | 77, 105 |
| Nose lower edge | 47-51 | Nose outside profile | 78-83 |
| Upper lip | 84-90, 96-100 | Lower lip | 91-95, 101-103 |

In an optional example, the hand key point can be defined as follows:

| Key point item | Key point serial number | Key point item | Key point serial number |
|---|---|---|---|
| Gesture box | 110-113 | center | 114 |

Where the key points with the serial numbers 110-113 are respectively four vertexes of the gesture detection box (i.e., a hand external box) and the key point with the serial number 114 is a center of the gesture detection box.

In an implementation of the embodiments of the present disclosure, in operation 104, the establishing the correspondence between the display position of the sub-material and the at least one predetermined key point may include:

establishing the correspondence between the display position of the sub-material and the at least one key point; and/or, establishing a correspondence between the display position of the sub-material and a central key point of a detection box.

For example, when the key points in the correspondence established in aforementioned embodiment of the present disclosure are a head key point, a face key point, a shoulder key point, an arm key point, a wrist key point, a leg key point, a foot key point, and a body skeleton key point, the correspondence between the display position of the sub-material and at least one key point of the aforementioned key points can be established; when the key points in the correspondence established in aforementioned embodiment of the present disclosure are a head key point, a face key point, a gesture key point, and a body skeleton key point, the correspondence between the display position of the sub-material and the central key point of the corresponding detection box (for example, a head detection box, a face detection box, a gesture detection box, and a body detection box).

In an implementation of the embodiments of the present disclosure, the playback parameter of the sub-material may include, but not limited to any one or more of:

1. A display parameter is used for representing whether to display the sub-material. The parameter value thereof includes two options "Yes" and "No"; when the parameter value is selected as "Yes", it represents that the corresponding sub-material is required to be displayed during a video playback process; when the parameter value is selected as "No", it represents that the corresponding sub-material does not required to be displayed during the video playback process.

2. A trigger action parameter is used for representing a trigger action for triggering the sub-material display and which type is used for triggering the sub-material display; the parameter value thereof may include each trigger action; a user may select at least one type from a preset type set as a trigger action. That is, during the video playback process, when detecting a corresponding trigger action, the corresponding sub-material can be triggered, for example, when detecting a trigger action of "opening the mouth" specified in the trigger action parameter in the video, starting to play an animation sub-material of spitting a rainbow; the start display time, the stop display time, the display duration, etc. of the sub-material can be determined according to the parameter values of other parameters, for example, they can be determined according to the parameter values of the delay trigger parameter, a trigger stop parameter, and a loop parameter.

3. A loop parameter is used for representing a number of loop playback times for the sub-material; the value of the number of loop playback times can be set or selected as the parameter value thereof, for example, 1, 5, etc., and it can be agreed that the parameter value set as 0 is an infinite loop playback.

4. A delay trigger parameter is used for representing time for delay displaying of the sub-material, i.e., when detecting the trigger action in the trigger action parameter from a certain frame in the video, delay for how many frames to start to display the sub-material; the time for delay displaying of the sub-material can be set or selected as the parameter value thereof.

5. A trigger stop parameter is used for representing an action for stopping the sub-material display and which action is used for stopping the sub-material display; the parameter value thereof may include each trigger action; the user may select at least one type from a preset type set as a type for ending the sub-material. That is, during the video playback process, when detecting the trigger action specified in the trigger stop parameter, the display/playback of the corresponding sub-material can be stopped, for example, for detecting the trigger action "opening the mouth" specified in the trigger action parameter in the video, starting to play the animation sub-material of splitting a rainbow, and it can be set that the parameter value of the trigger stop parameter is "closing the mouth", and therefore, when detecting the type of "closing the mouth" in the video, the rainbow is gone.

6. A display size parameter is used for representing a reference basis for the change of the display size of the sub-material for implementing the display effect of the nearer the larger and the farther the smaller of the sub-material. The parameter value of the display size parameter (i.e., the reference basis for the display size changes of the sub-material) can be two or more key points in the preset key points (which may be represented as: Point A and Point B); at this moment, the display size of the sub-material would change with the change of the proportion of the size formed by the two or more key points serving as the reference basis in the video. For example, when the parameter values of the display size parameter selected for the sub-material, the glasses, are the key points representing the left eye pupil center and the right eye pupil center, during video playing, the display size of the sub-material would change with the change of the long and short proportion of the connection line between the two key points. If the parameter values of the display size are not changed, the default parameter value may be the two key points on the reference part corresponding to the sub-material.

7. A position type parameter is for representing a relation type between the sub-material and the position.

8. A position relation type parameter is used for representing whether the sub-material moves with a preset reference part, which refers to whether the sub-material moves with the position of the reference part, and may include two options, "Yes, Move With Position" and "No"; when the parameter value is selected as "Yes", the sub-material moves with the position of the reference part, and if the parameter value of the position type parameter is the foreground, the parameter value is selected as "No", representing that the sub-material does not move with the position of the reference part.

9. A position parameter is for representing a position binding relation between the sub-material and a preset key point, which refers to the position relation between the sub-material and the preset key point during the video playback process; it can be selected the sub-material is bound with the positions of which key points in the preset key points.

10. A rotate parameter is used for representing a key point on which the rotation of the sub-material is based, and it can be selected which key point is based on during the video playback process of the sub-material.

In an optional example, the trigger action corresponding to the trigger action parameter includes any one or more of:

NULL, i.e., no action is required for displaying the sub-material;

an eye action, for example, blinking, closing the eye, opening the eye, etc.;

a head action, for example, shaking the head, nodding the head, titling the head, turning the head, etc.;

an eyebrow action, for example, raising the eyebrow, etc.;

a hand action, for example, a heart hand, handing hands, palm, thumb, bowing while holding fists, making finger heart with a single hand, OK hand, handssors, pistol hand, index finger, etc.;

a mouth action, for example, opening the mouth, closing the mouth, etc.;

a shoulder action, for example, shrugging the eyebrow, etc.;

other actions.

Figure 5:
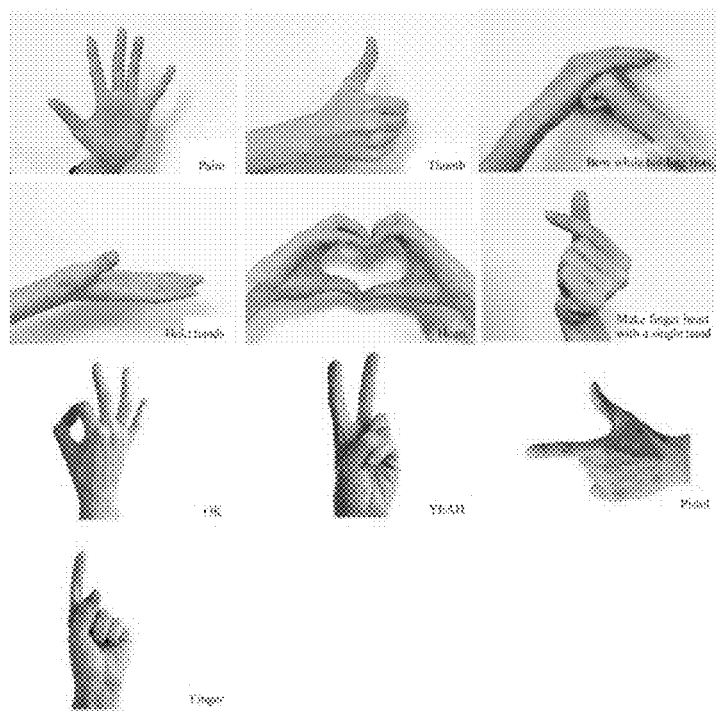
FIG. 5 is an exemplified schematic diagram of a hand action in the embodiments of the present disclosure.

FIG. 5 is an exemplified schematic diagram of a hand action in the embodiments of the present disclosure.

In an optional example, the aforementioned position type parameter, for example, may include any one of:

a parameter for representing a foreground: at this time, representing that the corresponding sub-material would be displayed during video playing as the foreground; during the playing process, the sub-material would be associated with the screen position of a display of the playback terminal, and the position of the central point thereof would remain unchanged on the screen of the display;

a parameter for representing locating and/or moving of the sub-material with a face position: representing that the reference part of corresponding to the corresponding sub-material is a face, and at this moment, the sub-material would be located and/or move with the face position during the video playback process;

a parameter for representing locating and/or moving of the sub-material with a hand position: representing that the reference part of corresponding to the corresponding sub-material is a gesture (i.e., a hand), and at this moment, the sub-material would be located and/or move with the hand position during the video playback process;

a parameter for representing locating and/or moving of the sub-material with a head position: representing that the sub-material would be located and/or move with the head position during the video playback process;

a parameter for representing locating and/or moving of the sub-material with a shoulder position: representing that the sub-material would move with the shoulder position during the video playback process;

a parameter for representing locating and/or moving of the sub-material with an arm position: representing that the sub-material would be located and/or move with the arm position during the video playback process;

a parameter for representing locating and/or moving of the sub-material with a wrist position: representing that the sub-material would be located and/or move with the wrist position during the video playback process;

a parameter for representing locating and/or moving of the sub-material with a leg position: representing that the sub-material would be located and/or move with the leg position during the video playback process;

a parameter for representing locating and/or moving of the sub-material with a foot position: representing that the sub-material would be located and/or move with the foot position during the video playback process;

a parameter for representing locating and/or moving of the sub-material with a body skeleton position: representing that the sub-material would be located and/or move with the body skeleton position during the video playback process;

a playback position relationship related to the reference part, for example, may include any or more of the position relations: the sub-material moving with the position of the reference part, and the sub-material scaling with the size of the reference part; the sub-material moving with the position of the reference part, the sub-material scaling with the size of the reference part, and the sub-material depth scaling with the rotation of the reference part; and the sub-material moving with the position of the reference part, the sub-material scaling with the size of the reference part, the sub-material depth scaling with the rotation of the reference part, and the sub-material rotating with the plane rotation of the reference part;

a parameter for representing a background: representing the sub-material would be displayed as the background during the video playback process, during the video playback process, the sub-material would be associated with the screen position of the display of the playback terminal, and the size of the sub-material would be adjusted, so that the coordinates of the four vertexes of the sub-material would be consistent with the four vertexes of the screen of the display.

In addition, further referring to FIG. 2, the apparatus for generating the special effect program file package of the embodiments of the present disclosure may further include a content display bar. Accordingly, in another embodiment of the method for generating the special effect program file package of the present disclosure, it may further include: displaying a reference image by using a content display bar, and displaying key points on the reference image; and the reference image including at least one reference part. The reference image includes at least one reference part. The reference part, for example, may include any one or more of: an ear, a hand, a face, hair, a neck, a shoulder, etc.

Exemplarily, the aforementioned reference image, for example, may be: at least one part of images of the reference character, for example, at least one or more of the images of the reference character: a complete image, a head image, a face image, a shoulder image, an arm image, a gesture image, a wrist image, a leg image, a foot image, a complete image of the reference character, etc.

In addition, in another embodiment of the method for generating the special effect program file package of the present disclosure, by means of operation 102, after importing the sub-material, it may further include: displaying a reference image by using the content display bar; and it may include: displaying the imported sub-material at the content display bar according to the parameter value of the playback parameter of the imported sub-material. For example, the imported sub-material can be displayed at the content display bar according to the preset display position and display size of the sub-material.

After the sub-material is imported into the content display bar, the user may change the display position of the displayed sub-material in the content display bar or adjust the display size thereof. Hence, in further optional embodiments, it may further include: according to a position movement operation for the sub-material received in the content display bar, updating a display position of the sub-material in the content display bar and updating the corresponding parameter value in the playback parameter of the sub-material. Or it may further include: according to a size adjustment operation for the sub-material received in the content display bar, updating a display size of the sub-material in the content display bar and updating the corresponding parameter value in the playback parameter of the sub-material. For example, the user may select a sub-material displayed in the content display bar by means of a mouse, move the mouse to a small box at the right lower corner of the sub-material, and move the small box to scale the sub-material, so as to adjust the display size of the sub-material; the user may select a sub-material display in the content display bar by means of the mouse and directly move the position thereof to move the sub-material to a correct or desired position. In the playback of the special effect program file package of the subsequent sub-material, the position and display proportion of the sub-material on the playback terminal would be consistent with those in the content display bar. Based on any embodiment of the present disclosure above, the user may add a special effect for multiple reference parts, for example, an ear, a face, and a hand may be respectively used as the target parts to be currently required to add the special effect; executing any embodiment above implements the special effect function of the sub-materials of the ear, face, and hand parts.

When the user imports two or more sub-materials, the display layer of each sub-material can be adjusted (i.e., the shielding relationship). Hence, in another embodiment of the method for generating the special effect program file package of the present disclosure, it may further include: adjusting a shielding relationship between the two or more sub-materials according to a layer parameter adjustment instruction sent for two or more sub-materials received through the interaction interface of the operation bar, and displaying the two or more sub-materials in the content display bar according to the adjusted shielding relationship and the parameter value of the playback parameter.

In a further embodiment of the method for generating the special effect program file package of the present disclosure, it further includes: the apparatus for generating the special effect program file package starts according to the received start instruction and displays the operation interface; the operation interface includes: an operation bar, a content display bar, and a program file bar.

As shown in FIG. 2, in an optional example, the aforementioned operation interface includes left, middle, and right, i.e., three regions. Accordingly, the aforementioned display operation interface may include: displaying the operation bar at the left of the operation interface, displaying the content display bar at the middle of the operation interface, and displaying the program file bar at the right of the operation interface.

The sub-material may be imported through the interaction interface 20 n the left operation bar; the shielding relationship between the sub-material layers can be adjusted by means of the interaction interface 21; the layer parameter for each sub-material is set; the parameter value for the playback parameter of each sub-material can be set by means of the interaction interface 23; the content display bar uses the average face as the reference face; all imported sub-materials are directly displayed; the position of the displayed sub-material can be moved by means of the mouse; the right program file display bar is used for displaying the content of the playback program file of the sub-material with the currently set parameter value by means of the display region 24 therein; by means of the instruction storage interface 25 in the program file display bar, the special effect program file package can be exported, i.e., generating and storing the special effect program file package.

Figure 6:
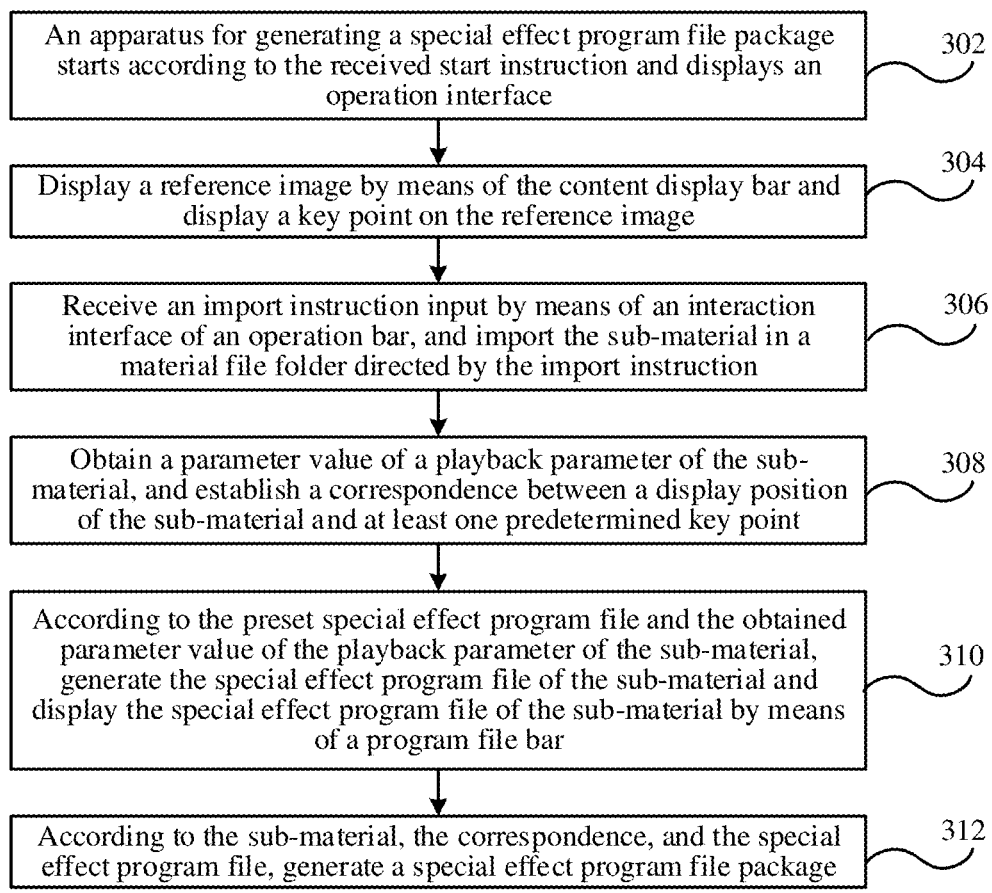
FIG. 6 is a flowchart of another embodiment of a method for generating a special effect program file package of the present disclosure.

FIG. 6 is a flowchart of another embodiment of a method for generating a special effect program file package of the present disclosure. As shown in FIG. 6, the method for generating a special effect program file package includes the following operations.

In 302, an apparatus for generating a special effect program file package starts according to the received start instruction and displays an operation interface.

The operation interface includes: an operation bar, a content display bar, and a program file bar.

In 304, a reference image is displayed by using the content display bar and a key point on the reference image is displayed.

The reference image includes at least one reference part.

In an optional example, the operation 304 may be executed by a processor by invoking a corresponding instruction stored in a memory, or may be executed by the content display bar on the operation interface run by the processor.

In 306, an import instruction sent through an interaction interface of an operation bar is received, and the sub-material in a material file folder directed by the import instruction is imported.

In an optional example, the operation 306 may be performed by a processor by invoking a corresponding instruction stored in a memory, and may also be performed by a first import module run by the processor.

In 308, a parameter value of a playback parameter of the sub-material is obtained, and a correspondence between a display position of the sub-material and at least one predetermined key point is established.

In an optional example, the operation 308 may be performed by a processor by invoking a corresponding instruction stored in a memory, and may also be performed by a first obtaining module run by the processor.

In 310, according to the preset special effect program file and the obtained parameter value of the playback parameter of the sub-material, the special effect program file of the sub-material is generated and the special effect program file of the sub-material is displayed by using a program file bar.

In an optional example, the operation 310 may be executed by a processor by invoking a corresponding instruction stored in a memory, or may be executed by the program file bar on the operation interface run by the processor.

In 312, according to the sub-material, the correspondence, and the special effect program file, a special effect program file package is generated.

In an optional instance, the operation 312 may be performed by a processor by invoking a corresponding instruction stored in a memory, and may also be performed by a first generation module run by the processor.

In addition, after the generating the special effect program file package according to any embodiment of the present disclosure, it may further include: storing the special effect program file package at a position directed by a storage instruction according to the received storage instruction.

In an implementation, the storing the special effect program file package at the position directed by the storage instruction according to the received storage instruction may include:

in response to reception of the storage instruction, displaying a storage path selection interface and a compression interface;

receiving a storage position sent through the storage path selection interface; and receiving a compression mode sent based on the compression interface and compressing according to the compression mode, the special program file package of the sub-material and generating a compression file package; and storing the compression file package in a file folder to which the storage position is directed.

When the size of the special effect program file package is large, and is not adapted to be running in a cellphone terminal, the embodiments of the present disclosure may compress the special effect program file package and then store same so as to be imported into the cellphone terminal for special effect generation. The embodiments of the present disclosure only compress the size of the special effect program file package but do not change the size of the sub-material in the special effect program file package, i.e., the size of the sub-material in the special effect program file package is maintained as the size of the sub-material before imported.

After the special effect program file package is generated based on the embodiments of the present disclosure, the special effect program file package can be imported into the terminal, to perform special effect generation on the video played at the terminal.

Figure 7:
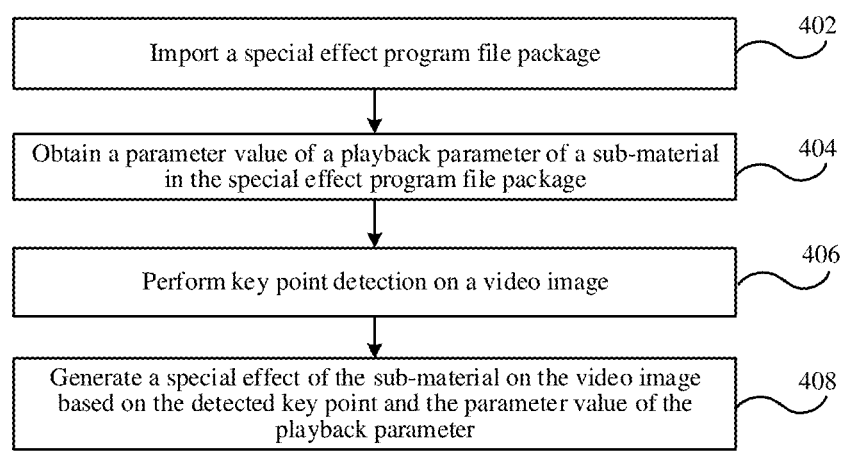
FIG. 7 is a flowchart of an embodiment of a method for generating a special effect of the present disclosure.

FIG. 7 is a flowchart of an embodiment of a method for generating a special effect of the present disclosure. As shown in FIG. 7, the method for generating a special effect of the embodiment includes the following operations.

In 402, a special effect program file package is imported.

The special effect program file package may include a sub-material and the parameter value of the playback parameter of the sub-material and the parameter value of the playback parameter of the sub-material includes a correspondence between a display position of the sub-material and at least one predetermined key point.

In an implementation, the type of the playback parameter of the sub-material may refer to the recitation of the aforementioned embodiments of the present disclosure and are omitted herein for simplification.

In an implementation, operation 402 may include: reading the special effect program file package into an internal storage by calling a first interface function used for reading a sticker material; and parsing the special effect program file package, and obtaining he sub-material and a special effect program file, the special effect program file including the parameter value of the playback parameter of the sub-material.

In an optional example, the aforementioned special effect program file may include: a json program or special effect program files of other executable programs.

In an implementation, the special effect program file package in the special effect generation device embodiments of the present disclosure may be the special program file package generated by means of any of the aforementioned special effect program file package generation method embodiments of the present disclosure.

In an optional example, the operation 402 may be performed by a processor by invoking a corresponding instruction stored in a memory, and may also be performed by a second import module run by the processor.

In 404, a parameter value of a playback parameter of a sub-material in the special effect program file package is obtained.

In an optional example, operation 404 may be performed by a processor by invoking a corresponding instruction stored in a memory, and may also be performed by a second obtaining module run by the processor.

In 406, key point detection is performed on a video image.

In an implementation, by using a neural network, key point detection related to the correspondence can be performed on the video image and a key point detection result can be output.

The key point detection result, for example, may include, but not limited to, any one or more of: a position of the key point related to the correspondence in the image in the video; and a preset serial number of the key point related to the correspondence in the special effect program file package.

In an implementation, the type of the key point of the sub-material may refer to the recitation of the aforementioned embodiments of the present disclosure and are omitted herein for simplification.

In an optional example, the operation 406 may be performed by a processor by invoking a corresponding instruction stored in a memory, and may also be performed by a key point detection module run by the processor.

In 408, based on the detected key point and the parameter value of the playback parameter, a special effect of the sub-material on the video image is generated.

In an optional instance, the operation 106 may be performed by a processor by invoking a corresponding instruction stored in a memory, and may also be performed by a second generation module run by the processor.

For the method for generating a special effect provided according to the aforementioned embodiments of the present disclosure, a special effect program file package is imported; a parameter value of a playback parameter of a sub-material in the special effect program file package is obtained; key point detection is performed on a video image; and based on the detected key point and the parameter value of the playback parameter, a special effect of the sub-material on the video image is generated. The embodiments of the present disclosure performs key point detection on the video image by means of the parameter value of the playback parameter of the sub-material in the special effect program file package generated in advance, to generate the special effect on the video, so as to implement the special effect playback of the video and improve the video playback effect.

In an implementation, operation 404 may include: creating a sticker handle by using a second interface function used for creating a sticker handle; and reading the sub-material and the parameter value of the playback parameter in the special effect program file and storing into the sticker handle.

In addition, in another embodiment of the method for generating a special effect of the present disclosure, it may further includes: obtaining the position and video frame number of the sub-material displayed in the video, and reading a video image corresponding to the video frame number from the video in advance according to the parameter value of the playback parameter in the special effect program file in the sticker handle.

Accordingly, in an implementation, operation 408 may include:

by calling a third interface function used for rendering a sticker material, reading the sub-material required to be displayed on the present video image of the video from the sticker handle;

according to the detected key point and the parameter value of the playback parameter of the sub-material required to be displayed on the present video image, determining a playback state and a display position of the sub-material required to be displayed on the present video image; and according to the playback state of the sub-material required to be displayed on the present video image, displaying the sub-material required to be displayed on the present video image on the display position of the present video image.

In an implementation, it may further include: in response to completion of playing the special effect program file package, destroying the sticker handle by calling a fourth interface function used for destroying the sticker handle.

Figure 8:
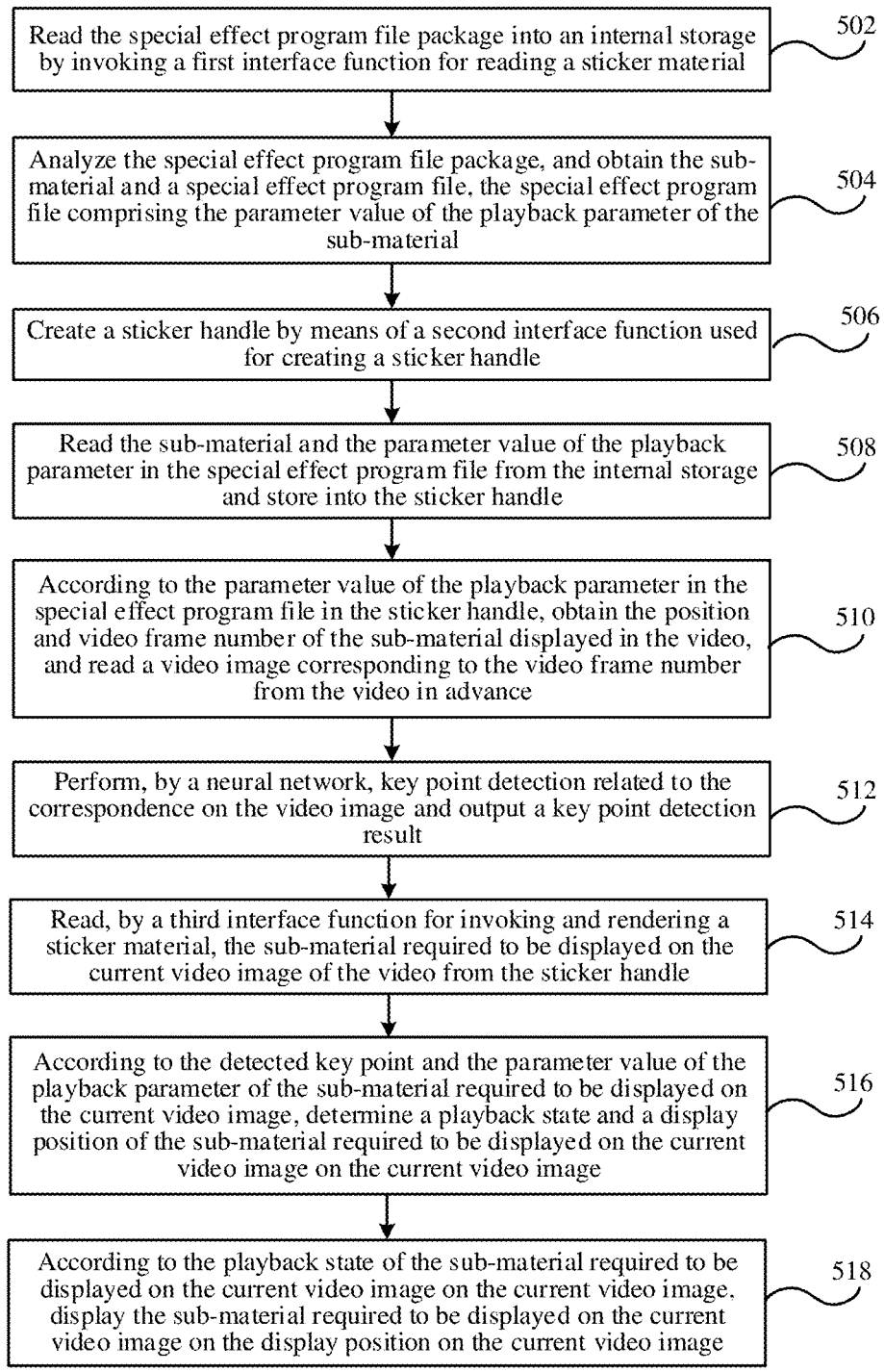
FIG. 8 is a flowchart of another embodiment of a method for generating a special effect of the present disclosure.

FIG. 8 is a flowchart of another embodiment of a method for generating a special effect of the present disclosure. As shown in FIG. 8, the method for generating a special effect of the embodiment includes the following operations.

In 502, the special effect program file package is read into an internal storage by calling a first interface function used for reading a sticker material.

In 504, the special effect program file package is parsed, and the sub-material and a special effect program file are obtained, the special effect program file including the parameter value of the playback parameter of the sub-material.

In an optional example, the operations 502-504 may be performed by a processor by invoking a corresponding instruction stored in a memory, and may also be performed by a second import module run by the processor.

In 506, a sticker handle is created through a second interface function used for creating a sticker handle.

In 508, the sub-material and the parameter value of the playback parameter in the special effect program file are read from the internal storage and are stored into the sticker handle.

In an optional example, operations 506-508 may be performed by a processor by invoking a corresponding instruction stored in a memory, and may also be performed by a second obtaining module run by the processor.

In 510, the position and video frame number of the sub-material displayed in the video are obtained, and a video image corresponding to the video frame number is read from the video in advance according to the parameter value of the playback parameter in the special effect program file in the sticker handle.

In an optional example, the operation 510 may be performed by a processor by invoking a corresponding instruction stored in a memory, and may also be performed by a first obtaining module run by the processor.

In 512, by means of a neural network, key point detection related to the correspondence is performed on the video image and a key point detection result is output.

In an optional example, the operation 512 may be performed by a processor by invoking a corresponding instruction stored in a memory, and may also be performed by a key point detection module run by the processor.

In 514, by calling a third interface function used for rendering a sticker material, the sub-material required to be displayed on the present video image of the video is read from the sticker handle.

In 516, according to the detected key point and the parameter value of the playback parameter of the sub-material required to be displayed on the present video image, a playback state and a display position of the sub-material required to be displayed on the present video image are determined.

In 518, according to the playback state of the sub-material required to be displayed on the present video image, the sub-material required to be displayed on the present video image is displayed on the display position of the present video image.

In an optional instance, operations 514-518 may be performed by a processor by invoking a corresponding instruction stored in a memory, and may also be performed by a second generation module run by the processor.

The special effect generation method embodiments of the present disclosure may be used for various video playback scenes, for example, for the video live-broadcasting scene including a character, to generate a special effect for the live-broadcasting video, and overlaying the sub-material on the corresponding part of the character according to the special effect program file package of the sub-material for playing. The corresponding part, for example, may be: the ear, hand, face, hair, neck, shoulder, etc.

Any method for generating a special effect program file package and method for generating a special effect provided by the embodiments of the present disclosure cab be executed by any appropriate device having data processing capability, including, but not limited to, a terminal device, a server and the like. Or any method for generating a special effect program file package and method for generating a special effect provided by the embodiments of the present disclosure cab be executed by a processor, for example, the processor executes any method for generating a special effect program file package and method for generating a special effect mentioned in the embodiments of the present disclosure by invoking the corresponding instructions stored in the memory. Details are not described below again.

A person of ordinary skill in the art may understand that all or some steps for implementing the foregoing method embodiments are achieved by a program by instructing related hardware; the foregoing program can be stored in a computer-readable storage medium; when the program is executed, steps including the foregoing method embodiments are executed. Moreover, the foregoing storage medium includes various media capable of storing program codes, such as a Read-Only Memory (ROM), a Random Access Memory (RAM), a magnetic disk, or an optical disk.

Figure 9:
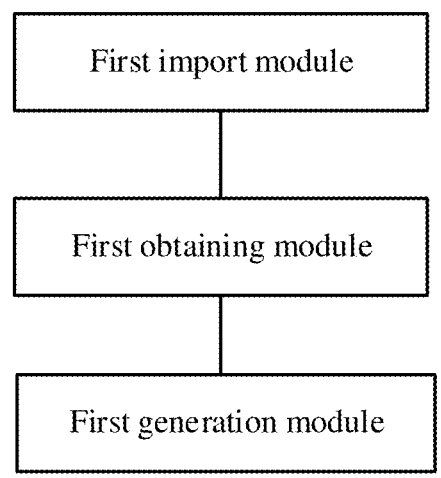
FIG. 9 is a schematic structural diagram of an embodiment of a method for generating a special effect program file package of the present disclosure.

FIG. 9 is a schematic structural diagram of an embodiment of a method for generating a special effect program file package of the present disclosure. The apparatus for generating the special effect program file package of the embodiment can be used for implementing the aforementioned special effect program file package generation method embodiments of the present disclosure. As shown in FIG. 9, the apparatus for generating the special effect program file package of the embodiment includes: a first import module, a first obtaining module, and a first generation module.

The first import module is configured to import a sub-material. In an implementation of the embodiments of the present disclosure, the sub-material, for example, may include, but not limited to, any one or more of: a picture, an animation, a video, a sound, etc.

The first obtaining module is configured to obtain a parameter value of a playback parameter of the sub-material, and establish a correspondence between a display position of the sub-material and at least one predetermined key point.

In an implementation, the type of the key point and the playback parameter of the sub-material may refer to the recitation of the aforementioned embodiments of the present disclosure and are omitted herein for simplification.

The first generation module is configured to generate a special effect program file package according to the sub-material, the correspondence, and the parameter value.

For the apparatus for generating a special effect program file package provided according to the aforementioned embodiments of the present disclosure, when generating the special effect program file package, a sub-material is imported; a parameter value of a playback parameter of the sub-material is obtained, and a correspondence between a display position of the sub-material and at least one predetermined key point is established; and a special effect program file package is generated according to the sub-material, the correspondence, and the parameter value, so that the special effect processing is made based on the special effect program file package. The embodiments of the present disclosure can generate a special effect program file that can be executed by a rendering engine without manually writing the program file; the operation is simple, the required time is short, the entire efficiency for implementing the special effect is improved, errors that may occur during manually writing the program file are avoided, and accuracy of the special effect function is effectively guaranteed.

Figure 10:
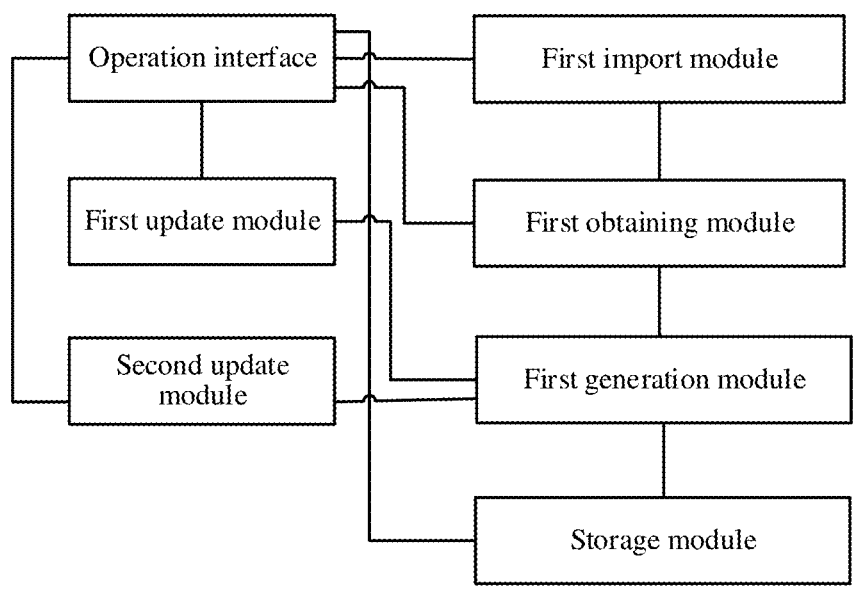
FIG. 10 is a structural schematic diagram of another embodiment of a method for generating a special effect program file package of the present disclosure.

FIG. 10 is a structural schematic diagram of another embodiment of a method for generating a special effect program file package of the present disclosure. As shown in FIG. 10, upon comparison between the embodiments shown in FIG. 9, the generation apparatus of the embodiment further includes an operation interface; the operation interface includes an operation bar; as shown in FIG. 2, it is a sample graph of the operation interface. Accordingly, in the embodiment, the first import module is configured to receive an import instruction sent by means of an interaction interface of an operation bar, and import the sub-material in a material file folder directed by the import instruction.

In an implementation, the first import module is configured to: receive the import instruction sent through the interaction interface in a special effect parameter setting interface of the operation bar, and import the sub-material of the material file folder to which the import instruction is directed; or receive a selection instruction sent through the interaction interface of the operation bar, use a reference part selected by the selection instruction as a target part to be currently required to add a special effect, and display the special effect parameter setting interface of the target part at the operation bar; and receive the import instruction sent through the interaction interface in the special effect parameter setting interface, and import the sub-material in the material file folder to which the import instruction is directed.

In an optional example, the first import module is configured to: receive the import instruction sent through the interaction interface, and obtain and display the material file folder directed by the import instruction; import the sub-material selected by a sub-material selection operation in response to that the sub-material selection operation on the material file folder is received; and/or select a sub-material in the material file folder according to a preset setting and importing a sub-material selected according to the preset setting in response to that the sub-material selection operation on the material file folder is not received.

In an implementation, the obtaining a parameter value of a playback parameter of the sub-material, includes: in response to that the parameter value set for the playback parameter of the sub-material sent through the interaction interface in the special effect parameter setting interface is received, using the set parameter value as the parameter value of the playback parameter of the sub-material; and/or, in response to the parameter value set for the playback parameter of the sub-material sent through the interaction interface in the special effect parameter setting interface is not received, using a preset parameter value as the parameter value of the playback parameter of the sub-material.

In addition, in another implementation, the operation interface may further include the content display bar, for displaying the reference image and displaying the key point on the reference image, where the reference image includes at least one reference part. As shown in FIG. 2, it is a sample diagram of the operation interface.

Exemplarily, the aforementioned reference image, for example, may be: at least one part of images of the reference character, for example, at least one or more of the images of the reference character: a complete image, a head image, a face image, a shoulder image, an arm image, a gesture image, a wrist image, a leg image, a foot image, a complete image of the reference character, etc.

In another embodiment of the generation apparatus of the present disclosure, the content display bar can further be used for displaying the imported sub-material according to the parameter value of the playback parameter of the sub-material.

In addition, further referring to FIG. 10, the generation apparatus of the embodiments of the present disclosure may further include: a first update module, configured to, according to a position movement operation for the sub-material received in the content display bar, update a display position of the sub-material in the content display bar and update the corresponding parameter value in the playback parameter of the sub-material.

In addition, further referring to FIG. 10, the generation apparatus of the embodiments of the present disclosure may further include: a second update module, configured to, according to a size adjustment operation for the sub-material received in the content display bar, update a display size of the sub-material in the content display bar and update the corresponding parameter value in the playback parameter of the sub-material.

In addition, further referring to FIG. 10, the generation apparatus of the embodiments of the present disclosure may further include: an adjustment module, configured to adjust a shielding relationship between the two or more sub-materials according to a layer parameter adjustment instruction sent for two or more sub-materials received through the interaction interface of the operation bar, and display the two or more sub-materials according to the adjusted shielding relationship and the parameter value of the playback parameter.

In addition, the operation interface may further include: a program file bar, configured to, according to the preset special effect program file and the parameter value of the playback parameter of the sub-material, generate the special effect program file of the sub-material and display the special effect program file of the sub-material. The special effect program file, for example, may include, but not limited to: the special effect program file generated by the json program.

With reference to FIG. 2, the operation interface may include left, middle, and right, i.e., three regions. The left of the operation interface is configured to display the operation bar, the middle of the operation interface is configured to display the content display bar, and the right of the operation interface is configured to display the program file bar.

In addition, further referring to FIG. 10, the generation apparatus of the embodiments of the present disclosure may further include: a storage module, configured to store the special effect program file package at a position directed by a storage instruction according to the received storage instruction.

In an implementation, the storage module is configured to: in response to reception of the storage instruction, display a storage path selection interface and a compression interface; receive a storage position sent through the storage path selection interface; and receive a compression mode sent based on the compression interface and according to the compression mode, compress the special program file package of the sub-material and generate a compression file package; and store the compression file package in a file folder directed by the storage position.

In an optional example, the size of the sub-material in the special effect program file package is maintained as the size of the sub-material before imported.

Figure 11:
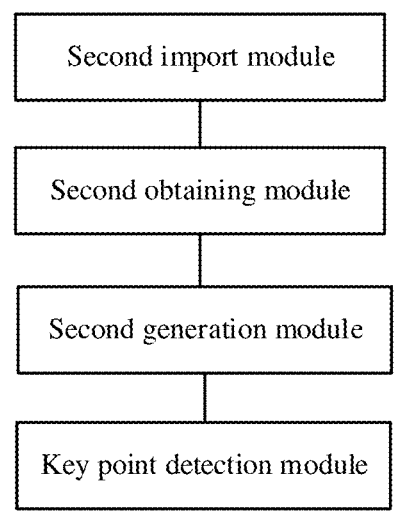
FIG. 11 is a schematic structural diagram of an embodiment of an apparatus for generating a special effect of the present disclosure.

FIG. 11 is a schematic structural diagram of an embodiment of an apparatus for generating a special effect of the present disclosure. The special effect generation apparatus of the embodiment can be used for implementing the foregoing special effect generation method embodiments of the present disclosure. As shown in FIG. 11, the apparatus for generating a special effect of the embodiment includes: a second import module, a second obtaining module, a key point detection module, and a second generation module.

The second import module is configured to import a special effect program file package. The special effect program file package may include a sub-material and the parameter value of the playback parameter of the sub-material and the parameter value of the playback parameter of the sub-material includes a correspondence between a display position of the sub-material and at least one predetermined key point. In an implementation, the special effect program file package in the special effect generation apparatus embodiments of the present disclosure may be the special program file package generated by means of any of the aforementioned special effect program file package generation method or apparatus embodiments of the present disclosure.

The second obtaining module is configured to obtain a parameter value of a playback parameter of a sub-material in the special effect program file package.

The key point detection module is configured to perform key point detection on a video image.

The second generation module is configured to, based on the detected key point and the parameter value of the playback parameter, generate a special effect of the sub-material on the video image.

For the apparatus for generating a special effect provided according to the aforementioned embodiments of the present disclosure, a special effect program file package is imported; a parameter value of a playback parameter of a sub-material in the special effect program file package is obtained; key point detection is performed on a video image; and based on the detected key point and the parameter value of the playback parameter, a special effect of the sub-material on the video image is generated. The embodiments of the present disclosure performs key point detection on the video image by means of the parameter value of the playback parameter of the sub-material in the special effect program file package generated in advance, to generate the special effect on the video, so as to implement the special effect playback of the video and improve the video playback effect.

In an implementation, the second import module is configured to: read the special effect program file package into an internal storage by calling a first interface function used for reading a sticker material; and analyze the special effect program file package, and obtain he sub-material and a special effect program file, the special effect program file including the parameter value of the playback parameter of the sub-material. The special effect program file includes: a special effect program file of a json program In an implementation, the second obtaining module is configured to create a sticker handle by calling a second interface function used for creating a sticker handle; and read the sub-material and the parameter value of the playback parameter in the special effect program file and store into the sticker handle.

Figure 12:
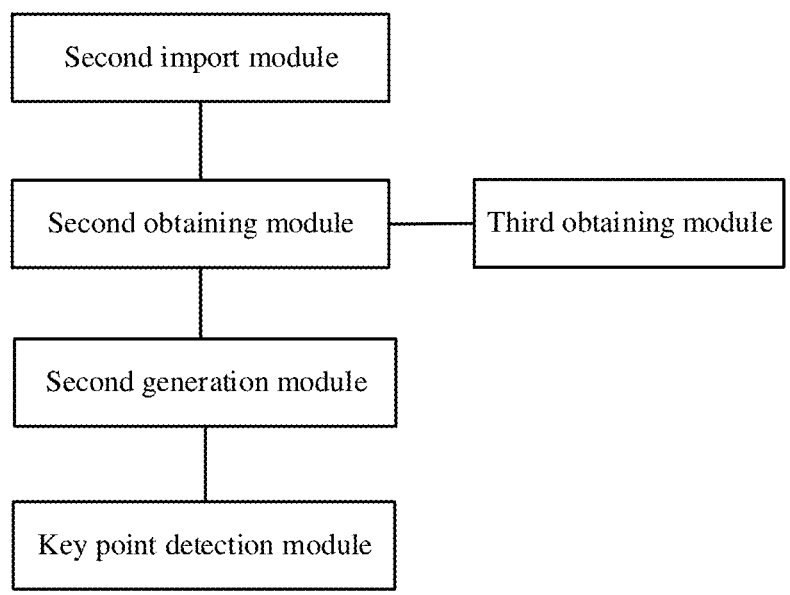
FIG. 12 is a schematic structural diagram of another embodiment of an apparatus for generating a special effect of the present disclosure.

FIG. 12 is a schematic structural diagram of another embodiment of an apparatus for generating a special effect of the present disclosure. As shown in FIG. 12, upon comparison between the embodiments shown in FIG. 11, the apparatus for generating a special effect of the embodiment further includes: a third obtaining module, configured to obtain the position and video frame number of the sub-material displayed in the video, and read a video image corresponding to the video frame number from the video in advance according to the parameter value of the playback parameter in the special effect program file in the sticker handle.

In an implementation, the second generation module is configured to: by calling a third interface function used for rendering a sticker material, read the sub-material required to be displayed on the current video image of the video from the sticker handle; according to the detected key point and the parameter value of the playback parameter of the sub-material required to be displayed on the present video image, determine a playback state and a display position of the sub-material required to be displayed on the present video image; and according to the playback state of the sub-material required to be displayed on the present video image, display the sub-material required to be displayed on the present video image on the display position of the present video image.

In addition, further referring to FIG. 12, in another embodiment of the apparatus for generating a special effect of the present disclosure, the second obtaining module can be further configured to: in response to playback completion of the special effect program file package, destroy the sticker handle by calling a fourth interface function used for destroying the sticker handle.

In an implementation of the special effect generation apparatus embodiments of the present disclosure, the key point detection module is configured to: by using a neural network, perform key point detection related to the correspondence on the video image and output a key point detection result.

The key point detection result, for example, may include any one or more of: a position of the key point related to the correspondence in the image in the video; and a preset serial number of the key point related to the correspondence.

In addition, another electronic device provided in the embodiments of the present disclosure includes:

a memory, configured to store computer programs; and a processor, configured to execute the computer programs stored in the memory and to implement the method for generating a special effect program file package or the method for generating a special effect according to any embodiment when the computer program is executed.

Figure 13:
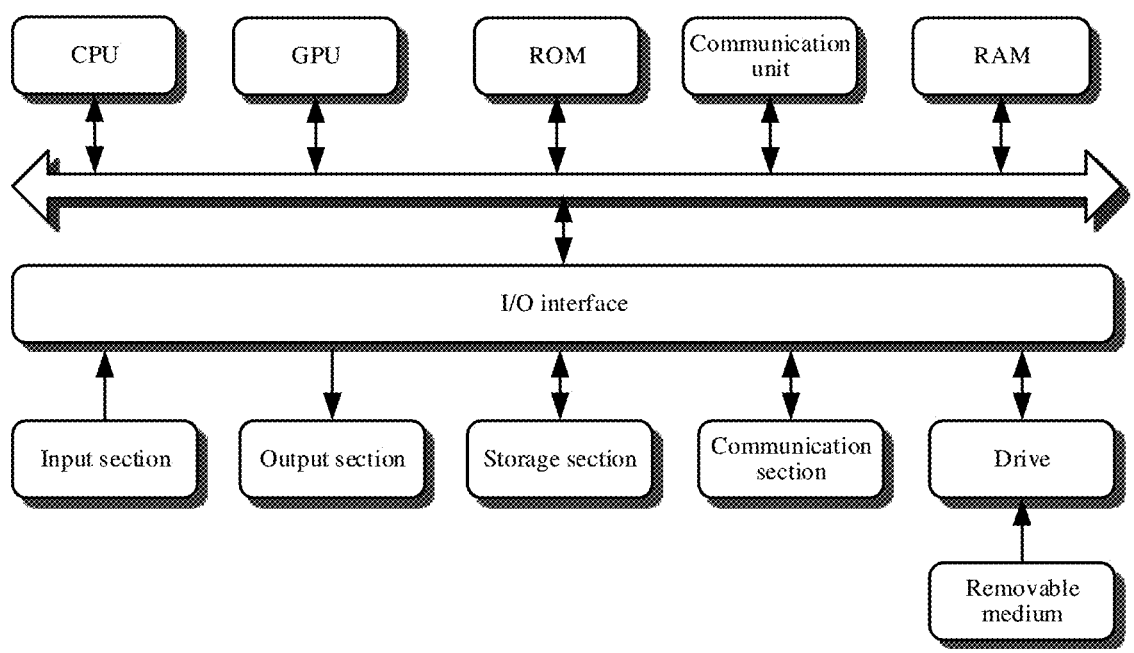
FIG. 13 is a schematic structural diagram of an application embodiment of an electronic device of the present disclosure.

FIG. 13 is a schematic structural diagram of an application embodiment of an electronic device of the present disclosure. Referring to FIG. 13 below, a schematic structural diagram of an electronic device suitable for implementing a terminal device or a server according to the embodiments of the present disclosure is shown. As shown in FIG. 13, the electronic device includes one or more processors, a communication part, and the like. The one or more processors are, for example, one or more Central Processing Units (CPUs), and/or one or more Graphic Processing Units (GPUs), and the like. The processor may perform various appropriate actions and processing according to executable instructions stored in a Read-Only Memory (ROM) or executable instructions loaded from a storage section to a Random Access Memory (RAM). The processor may include, but not limited to a network card; the network card may include, but not limited to an Infiniband (IB) network card; the processor may communicate with the ROM and/or the RAM, to execute executable instructions, is connected to the communication part via a bus, and communicates with other target devices via the communication part, thereby implementing corresponding operations in any method provided in the embodiments of the present disclosure. For example, the sub-material is imported; a parameter value of a playback parameter of the sub-material is obtained, and a correspondence between a display position of the sub-material and at least one predetermined key point is established; and a special effect program file package is generated according to the sub-material, the correspondence, and the parameter value. For another example, a special effect program file package is imported; a parameter value of a playback parameter of a sub-material in the special effect program file package is obtained; key point detection is performed on a video image; and based on the detected key point and the parameter value of the playback parameter, a special effect of the sub-material on the video image is generated.

In addition, the RAM may further store various programs and data required for operations of an apparatus. The CPU, the ROM, and the RAM are connected to each other via the bus. In the presence of the RAM, the ROM is an optional module. The RAM stores executable instructions, or writes the executable instructions into the ROM during running, where the executable instructions cause the processor to execute corresponding operations of any method of the present disclosure. An input/output (I/O) interface is also connected to the bus. The communication part may be integrated, or may be configured to have a plurality of sub-modules (for example, a plurality of IB network cards) connected to the bus.

The following components are connected to the I/O interface: an input section including a keyboard, a mouse and the like; an output section including a Cathode-Ray Tube (CRT), a Liquid Crystal Display (LCD), a speaker and the like; the storage section including a hard disk and the like; and a communication section of a network interface card including an LAN card, a modem and the like. The communication section performs communication processing via a network such as the Internet. A drive is also connected to the I/O interface according to requirements. A removable medium such as a magnetic disk, an optical disk, a magneto-optical disk, a semiconductor memory or the like is mounted on the drive according to requirements, so that a computer program read from the removable medium may be installed on the storage section according to requirements.

It should be noted that the architecture illustrated in FIG. 13 is merely an optional implementation mode. During specific practice, the number and types of the components in FIG. 13 may be selected, decreased, increased, or replaced according to actual requirements. Different functional components may be separated or integrated or the like. For example, the GPU and the CPU may be separated, or the GPU may be integrated on the CPU, and the communication part may be separated from or integrated on the CPU or the GPU or the like. These alternative implementations all fall within the scope of protection of the present disclosure.

Particularly, the process described above with reference to the flowchart according to the embodiments of the present disclosure may be implemented as a computer software program. For example, the embodiments of the present disclosure include a computer program product. The computer program product includes a computer program tangibly included in a machine-readable medium. The computer program includes a program code for performing a method shown in the flowchart. The program code may include instructions for performing steps of the face anti-counterfeiting detection method provided in the embodiments of the present disclosure. In such an embodiment, the computer program is downloaded and installed from the network through the communication section, and/or is installed from the removable medium. When the computer program is executed by the CPU, the functions defined in the method according to the present disclosure are executed.

In addition, the embodiment of the present disclosure also provides a computer program, including computer instructions. When the computer instructions run in a processor of a device, the method for generating a special effect program file package or the method for generating a special effect according to any one of the foregoing embodiments of the present disclosure is implemented.

In addition, the embodiment of the present disclosure also provides a computer readable storage medium having a computer program stored thereon. When the computer program is executed by a processor, the method for generating a special effect program file package or the method for generating a special effect according to any one of the foregoing embodiments of the present disclosure is implemented. The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. Unless otherwise specially stated, the foregoing sequences of steps of the methods are merely for description, and are not intended to limit the steps of the methods of the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for generating a special effect program file package, comprising:
   importing a sub-material;
   obtaining a parameter value of a playback parameter of the sub-material, and establishing a correspondence between a display position of the sub-material and at least one predetermined key point; and
   generating a special effect program file package executable by a rendering engine according to the sub-material, the correspondence, and the parameter value, wherein the special effect program file package is executed for generating a special effect of the sub-material on a video based on the at least one predetermined key point and the parameter value;
   wherein the method further comprises:
   displaying a reference image by using a content display bar, and displaying key points of the reference image, wherein the reference image comprises at least one reference part,
   wherein the reference image comprises: at least one part of images of a reference character, and the at least one part of images of the reference character comprises at least one image of the following: a complete image, a head image, a face image, a shoulder image, an arm image, a gesture image, a wrist image, a leg image, or a foot image.

2. The method according to claim 1, wherein importing the sub-material, comprises:
   receiving an import instruction sent through an interaction interface of an operation bar, and importing the sub-material of a material file folder to which the import instruction is directed.

3. The method according to claim 2, wherein receiving the import instruction sent through the interaction interface of the operation bar, and importing the sub-material of the material file folder to which the import instruction is directed, comprises:
   receiving the import instruction sent through the interaction interface in a special effect parameter setting interface of the operation bar, and importing the sub-material of the material file folder to which the import instruction is directed; or
   receiving a selection instruction sent through the interaction interface of the operation bar, using a reference part selected by the selection instruction as a target part in which the special effect is presently to be added, and displaying the special effect parameter setting interface of the target part at the operation bar; and receiving the import instruction sent through the interaction interface in the special effect parameter setting interface, and importing the sub-material of the material file folder to which the import instruction is directed.

4. The method according to claim 3, wherein obtaining the parameter value of the playback parameter of the sub-material, comprises:
   in response to the parameter value set for the playback parameter of the sub-material sent through the interaction interface in the special effect parameter setting interface being received, using the set parameter value as the parameter value of the playback parameter of the sub-material; or,
   in response to the parameter value set for the playback parameter of the sub-material sent through the interaction interface in the special effect parameter setting interface not being received, using a preset parameter value as the parameter value of the playback parameter of the sub-material.

5. The method according to claim 2, wherein receiving the import instruction sent through the interaction interface, and importing the sub-material of the material file folder to which the import instruction is directed, comprises:
   receiving the import instruction sent through the interaction interface, and obtaining and displaying the material file folder to which the import instruction is directed; and
   in response to a sub-material selection operation on the material file folder being received, importing the sub-material selected by the sub-material selection operation; or,
   in response to the sub-material selection operation on the material file folder is not being received, selecting at least one sub-material in the material file folder according to a preset setting and importing the at least one sub-material selected according to the preset setting.

6. The method according to claim 1, wherein the at least one predetermined key point comprises at least one of: a head key point, a face key point, a shoulder key point, an arm key point, a gesture key point, a waist key point, a leg key point, a foot key point, or a body skeleton key point.

7. The method according to claim 1, wherein establishing the correspondence between the display position of the sub-material and the at least one predetermined key point, comprises:
   establishing the correspondence between the display position of the sub-material and the at least one predetermined key point; or,
   establishing a correspondence between the display position of the sub-material and a central key point of a detection box.

8. The method according to claim 1, wherein the playback parameter comprises at least one of the following:
   a display parameter, for representing whether to display the sub-material;
   a trigger action parameter, for representing a trigger action for triggering the display of the sub-material;
   a loop parameter, for representing a number of loop playback times for the sub-material;
   a delay trigger parameter, for representing time for delaying display of the sub-material;
   a trigger stop parameter, for representing an action for stopping the display of the sub-material;
   a display size parameter, for representing reference basis of display size changes of the sub-material;
   a position type parameter, for representing a relation type between the sub-material and the display position;
   a position relation type parameter, for representing whether the sub-material moves with a preset reference part;
   a position parameter, for representing a position binding relationship between the sub-material and a preset key point; and
   a rotate parameter, for representing a key point around which the sub-material is rotated,
   wherein the trigger action corresponding to the trigger action parameter comprises at least one of: no action for trigger, an eye action, a head action, an eyebrow action, a hand action, a mouth action, or a shoulder action, wherein the position type parameter comprises any one of:
- a parameter for representing a foreground;
- a parameter for representing at least one of locating or moving of the sub-material with a face position;
- a parameter for representing at least one of locating or moving of the sub-material with a hand position;
- a parameter for representing at least one of locating or moving of the sub-material with a head position;
- a parameter for representing at least one of locating or moving of the sub-material with a shoulder position;
- a parameter for representing at least one of locating or moving of the sub-material with an arm position;
- a parameter for representing at least one of locating or moving of the sub-material with a wrist position;
- a parameter for representing at least one of locating or moving of the sub-material with a leg position;
- a parameter for representing at least one of locating or moving of the sub-material with a foot position;
- a parameter for representing at least one of locating or moving of the sub-material with a body skeleton position;
- a playback position relationship related to a reference part; or
- a parameter for representing a background, wherein the playback position relationship related to the reference part comprises at least one of the following:
- the sub-material moving with a position of the reference part, and the sub-material scaling with a size of the reference part;
- the sub-material moving with the position of the reference part, the sub-material scaling with the size of the reference part, and a sub-material depth scaling with a rotation of the reference part; or
- the sub-material moving with the position of the reference part, the sub-material scaling with the size of the reference part, the sub-material depth scaling with the rotation of the reference part, and the sub-material rotating with a plane rotation of the reference part.

9. The method according to claim 8, wherein after importing the sub-material, the method further comprises:
- displaying the sub-material in the content display bar according to the parameter value of the playback parameter of the sub-material; or
- according to a position movement operation for the sub-material received in the content display bar, updating a display position of the sub-material in the content display bar and updating the corresponding parameter value in the playback parameter of the sub-material; or
- according to a size adjustment operation for the sub-material received in the content display bar, updating a display size of the sub-material in the content display bar and updating the corresponding parameter value in the playback parameter of the sub-material.

10. The method according to claim 1, further comprising: adjusting a shielding relationship between two or more sub-materials according to a layer parameter adjustment instruction sent for the two or more sub-materials received through an interaction interface of an operation bar, and displaying the two or more sub-materials according to the adjusted shielding relationship and the parameter value of the playback parameter.

11. The method according to claim 1, wherein before generating the special effect program file package, the method further comprises:
- generating, according to a preset special effect program file and the parameter value of the playback parameter of the sub-material, a special effect program file of the sub-material, and displaying the special effect program file of the sub-material by using a program file bar.

12. The method according to claim 1, further comprising:
- starting, upon receiving a start instruction, and displaying an operation interface, wherein the operation interface comprises at least one of: an operation bar, the content display bar, or a program file bar,
- wherein the operation interface comprises three regions on left, middle, and right; and
- the displaying the operation interface comprises:
  - displaying the operation bar at the left region of the operation interface, displaying the content display bar at the middle region of the operation interface, and displaying the program file bar at the right region of the operation interface.

13. The method according to claim 1, wherein after generating the special effect program file package, the method further comprises:
- storing, upon reception of a storage instruction, the special effect program file package at a position to which the storage instruction is directed.

14. The method according to claim 13, wherein storing, upon reception of the storage instruction, the special effect program file package at the position to which the storage instruction is directed, comprises:
- in response to reception of the storage instruction, displaying a storage path selection interface and a compression interface;
- receiving a storage position sent through the storage path selection interface; and
- receiving a compression mode sent based on the compression interface, and compressing, according to the compression mode, the special effect program file package of the sub-material and generating a compression file package; and
- storing the compression file package in a file folder to which the storage position is directed.

15. A method for generating a special effect, comprising:
- importing the special effect program file package generated according to claim 1 and executable by the rendering engine;
- obtaining the parameter value of the playback parameter of the sub-material in the special effect program file package;
- performing key point detection on a video image; and
- generating the special effect of the sub-material on the video image based on a detected key point and the parameter value of the playback parameter when the special effect program file package is executed.

16. The method according to claim 15, wherein the special effect program file package comprises the sub-material and the parameter value of the playback parameter of the sub-material, and the parameter value of the playback parameter of the sub-material comprises the correspondence between the display position of the sub-material and the at least one predetermined key point.

17. The method according to claim 16, wherein performing the key point detection on the video image, comprises:
- performing, by using a neural network, key point detection related to the correspondence on the video image and outputting a key point detection result, wherein the key point detection result comprises at least one of the following:
- a position of the detected key point related to the correspondence in the video image; or
- a preset serial number of the detected key point related to the correspondence.

18. The method according to claim 15, wherein importing the special effect program file package, comprises:
- reading the special effect program file package into an internal storage by calling a first interface function used for reading a sticker material; and
- parsing the special effect program file package, and obtaining the sub-material and a special effect program file, the special effect program file comprising the parameter value of the playback parameter of the sub-material.

19. The method according to claim 18, wherein obtaining the parameter value of the playback parameter of the sub-material in the special effect program file package, comprises:
- creating a sticker handle by using a second interface function used for creating a sticker handle; and
- reading the sub-material and the parameter value of the playback parameter in the special effect program file and storing into the sticker handle; or
- obtaining, according to the parameter value of the playback parameter in the special effect program file in the sticker handle, a position and video frame number of the sub-material displayed in a video, and previously reading a video image corresponding to the video frame number from the video.

20. The method according to claim 19, wherein generating the special effect of the sub-material on the video image based on the detected key point and the parameter value of the playback parameter, comprises:
- reading, by calling a third interface function used for rendering a sticker material, the sub-material to be displayed on a present video image of the video from the sticker handle;
- according to the detected key point and the parameter value of the playback parameter of the sub-material required to be displayed on the present video image, determining a playback state and a display position of the sub-material to be displayed on the present video image of the present video image; and
- according to the playback state of the sub-material to be displayed on the present video image of the present video image, displaying the sub-material required to be displayed on the present video image on the display position of the present video image.

21. An electronic device, comprising:
- a memory, configured to store computer programs; and
- a processor, configured to execute the computer programs stored in the memory,
- wherein upon execution of the computer programs, the processor is configured to:
  - import a sub-material; obtain a parameter value of a playback parameter of the sub-material and establish a correspondence between a display position of the sub-material and at least one predetermined key point; generate a special effect program file package executable by a rendering engine according to the sub-material, the correspondence, and the parameter value, wherein the special effect program file package is executed for generating a special effect of the sub-material on a video based on the at least one predetermined key point and the parameter value; and display a reference image by using a content display bar, and display key points of the reference image, wherein the reference image comprises at least one reference part, the reference image comprises: at least one part of images of a reference character, and the at least one part of images of the reference character comprises at least one image of the following: a complete image, a head image, a face image, a shoulder image, an arm image, a gesture image, a wrist image, a leg image, or a foot image, or
  - import the special effect program file package executable by the rendering engine; obtain the parameter value of the playback parameter of the sub-material in the special effect program file package; perform key point detection on a video image; and generate the special effect of the sub-material on the video image based on a detected key point and the parameter value of the playback parameter when the special effect program file package is executed.

22. A non-transitory computer readable storage medium, having computer programs stored thereon, wherein the computer programs, when being executed by a processor, cause the processor to implement the following:
- importing a sub-material; obtaining a parameter value of a playback parameter of the sub-material and establishing a correspondence between a display position of the sub-material and at least one predetermined key point; generating a special effect program file package executable by a rendering engine according to the sub-material, the correspondence, and the parameter value, wherein the special effect program file package is executed for generating a special effect of the sub-material on a video based on the at least one predetermined key point and the parameter value; and displaying a reference image by using a content display bar, and displaying key points of the reference image, wherein the reference image comprises at least one reference part, the reference image comprises: at least one part of images of a reference character, and the at least one part of images of the reference character comprises at least one image of the following: a complete image, a head image, a face image, a shoulder image, an arm image, a gesture image, a wrist image, a leg image, or a foot image, or
- importing the special effect program file package executable by the rendering engine; obtaining the parameter value of the playback parameter of the sub-material in the special effect program file package; performing key point detection on a video image; and generating the special effect of the sub-material on the video image based on a detected key point and the parameter value of the playback parameter when the special effect program file package is executed.

* * * * *